United States Patent
Schäfer

(10) Patent No.: US 7,781,922 B2
(45) Date of Patent: Aug. 24, 2010

(54) FACILITY AND METHOD FOR THE AUTOMATIC RECOGNITION AND DIFFERENTIATION OF SINGLE-CHANNEL OR DUAL-CHANNEL ELECTRONIC SENSORS CONNECTED TO A DUAL-CHANNEL SAFETY COMBINATION

(75) Inventor: Manfred Schäfer, Lauf (DE)

(73) Assignee: Siemens Aktiengesellschaft, Munich (DE)

( * ) Notice: Subject to any disclaimer, the term of this patent is extended or adjusted under 35 U.S.C. 154(b) by 251 days.

(21) Appl. No.: 12/075,721

(22) Filed: Mar. 13, 2008

(65) Prior Publication Data

US 2008/0231122 A1  Sep. 25, 2008

(30) Foreign Application Priority Data

Mar. 19, 2007 (EP) .................................. 07005591

(51) Int. Cl.
*H01H 9/12* (2006.01)
*H01H 9/00* (2006.01)

(52) U.S. Cl. .................................................... 307/326
(58) Field of Classification Search ................. 307/326
See application file for complete search history.

(56) References Cited

U.S. PATENT DOCUMENTS

| | | | | |
|---|---|---|---|---|
| 3,290,443 | A * | 12/1966 | Mergner et al. ............... 381/11 |
| 3,825,697 | A * | 7/1974 | Cornell et al. .................. 381/4 |
| 4,221,928 | A * | 9/1980 | Franssen et al. ............... 381/11 |
| 4,477,924 | A * | 10/1984 | Close ........................... 381/15 |
| 5,594,467 | A * | 1/1997 | Marlton et al. ............... 345/641 |
| 6,278,786 | B1 * | 8/2001 | McIntosh .................... 381/71.6 |
| 6,396,398 | B1 * | 5/2002 | Donat et al. ................. 340/508 |
| 6,628,015 | B2 * | 9/2003 | Pullmann et al. ............. 307/326 |
| 6,658,116 | B1 * | 12/2003 | Rychlak ........................ 381/11 |
| 6,778,867 | B1 * | 8/2004 | Ziegler et al. ................. 700/79 |
| 7,130,171 | B2 * | 10/2006 | Pullmann et al. .............. 361/62 |
| 7,286,886 | B2 * | 10/2007 | Klopfer et al. ................. 700/79 |
| 7,411,319 | B2 * | 8/2008 | Suhara et al. ................ 307/326 |
| 7,439,639 | B2 * | 10/2008 | Nitsche ....................... 307/326 |
| 7,439,869 | B2 * | 10/2008 | Papenbreer .................. 340/644 |
| 7,504,747 | B2 * | 3/2009 | Pullmann et al. ............. 307/117 |
| 7,562,261 | B2 * | 7/2009 | Meyer-Grafe et al. ......... 714/48 |
| 7,573,693 | B2 * | 8/2009 | Hornung ..................... 361/111 |
| 2003/0011250 | A1 | 1/2003 | Pullmann et al. |
| 2003/0058602 | A1 * | 3/2003 | Veil ............................. 361/166 |

(Continued)

*Primary Examiner*—Stephen W Jackson
*Assistant Examiner*—Adi Amrany

(57) ABSTRACT

A facility is described for the automatic recognition and differentiation of single-channel or dual-channel electronic sensors, which are connected to a dual-channel safety combination with two connecting line pairs for emergency stop facilities in the form of electronic sensors or emergency stop buttons, with a first connecting conductor pair being provided for single-channel operation and the first and a second connecting line pair being provided for dual-channel operation of the safety combination, said facility comprising an ohmic resistance arranged in at least a first connecting line of the second connecting line pair and a transistor connected by its emitter or collector to a first side of the ohmic resistance and by its base to a second side of the ohmic resistance in such a manner that during a current flow through a dual-channel electronic sensor connected to both connecting conductor pairs a voltage drop at the ohmic resistance switches the transistor, so that an output signal is generated at the collector or emitter of the transistor, indicating connection of the dual-channel electronic sensor. A method is also described for the automatic recognition and differentiation at least of single-channel or dual-channel electronic sensors connected to a dual-channel safety combination.

7 Claims, 1 Drawing Sheet

U.S. PATENT DOCUMENTS

| | | |
|---|---|---|
| 2005/0057868 A1 | 3/2005 | Pullmann et al. |
| 2006/0146469 A1* | 7/2006 | Heagerty et al. ............ 361/115 |
| 2007/0180286 A1* | 8/2007 | Oster et al. .................... 714/2 |
| 2008/0057858 A1* | 3/2008 | Smith ........................ 455/3.05 |
| 2008/0246344 A1* | 10/2008 | Pullmann et al. ............ 307/326 |

* cited by examiner

FACILITY AND METHOD FOR THE AUTOMATIC RECOGNITION AND DIFFERENTIATION OF SINGLE-CHANNEL OR DUAL-CHANNEL ELECTRONIC SENSORS CONNECTED TO A DUAL-CHANNEL SAFETY COMBINATION

CROSS REFERENCE TO RELATED APPLICATIONS

This application claims priority of European Patent Office application No. 07005591.8 EP filed Mar. 19, 2007, which is incorporated by reference herein in its entirety.

FIELD OF INVENTION

Safety combinations are deployed in areas in which significant human injury and environmental damage can result in the event of a failure or defect, for example in nuclear power plants. A safety combination serves to connect an emergency stop facility, for example an emergency stop button or an electronic sensor initiating an emergency stop, to an emergency shutdown facility, with the functionality of the emergency stop facility and the connecting lines between the emergency stop facility and the safety facility being permanently monitored.

BACKGROUND OF INVENTION

This is done by means of a permanent or pulsed low-voltage current flow by way of the connecting lines between the safety combination and the emergency stop facility. Since it can happen that an emergency stop facility embodied as an emergency stop button is mechanically blocked and as a result cannot be activated, it is normal practice to use what are known as dual-channel safety combinations, to which two emergency stop buttons, which are positioned in direct proximity to each other and are activated by way of a common contact button, are connected in parallel. Generally with dual-channel safety combinations, the connecting line pairs, made up of the lines to and from the two emergency stop buttons and also referred to as channels, run parallel to each other. This means there is a risk of what is known as a cross connection, wherein the current-carrying connecting lines are connected to each other. This means that the safety combination could no longer determine whether or not an emergency stop button had been activated.

As a counter-measure what is known as cross connection recognition is used to recognize a current flow between the two channels. This is done by pulsing the current flow through the two emergency stop buttons arranged parallel to each other one after the other in an alternating manner. If a current flow is determined at an input of the safety combination connected to a first emergency stop button at a time when a current pulse is emitted to an output of the safety combination connected to the second emergency stop button, this indicates a cross connection.

One difference when using electronic sensors in place of emergency stop buttons is that the function of the sensor or its outputs is checked regularly, by self-monitoring of the electronic sensor. To this end the electronic sensor transmits a low-voltage signal, which it switches off briefly at regular intervals. At the same time it is checked internally within the sensor whether or not the low voltage has been switched off at the output. If the low voltage has been switched off, the signal is supplied to the output again. The brief switching off, checking and switching on again take place so quickly that the operation cannot be recognized by the safety combination.

For economical reasons it is not expedient when producing safety combinations to differentiate between single-channel and dual-channel safety combinations for electronic sensors initiating an emergency stop and emergency stop buttons. Also it frequently happens that already installed safety combinations are changed from emergency stop buttons to electronic sensors or vice versa, since requirements change over time.

For this reason safety combinations are mainly embodied as dual-channel. These dual-channel safety combinations have an internal switchover between single-channel and dual-channel operation. During single-channel operation an electronic sensor or an emergency stop button can be connected. During dual-channel operation the safety combination carries out cross connection recognition by means of pulsed current flows. Also bidirectional bridges are arranged in the safety combination, with which the two channels have to be connected electrically to each other in single-channel operation.

If a dual-channel electronic sensor is to be connected to a dual-channel safety combination thus equipped, cross connection recognition must be carried out as with two emergency stop buttons connected in parallel. While in the case of emergency stop buttons the safety combination monitors for cross connection up to the emergency stop buttons, electronic sensors connected to the safety combinations provide cross connection monitoring up to the terminals of the safety combination itself, since dual-channel sensors have to monitor themselves in any case, just like single-channel sensors. To facilitate this, the safety combination must be switched to single-channel operation, with the result that the cross connection recognition of the safety combination is deactivated and the electrical connection between the two channels is broken by removing or switching over at least one bridge.

This procedure is prone to error, time-consuming and therefore expensive and represents a potential source of error and therefore a safety risk.

SUMMARY OF INVENTION

An object of the invention is to develop a facility and method for the automatic recognition and differentiation of single-channel or dual-channel electronic sensors connected to a safety combination.

The object is achieved by the features of an independent claim and by the features of dependent claims.

A first subject of the invention therefore relates to a facility for the automatic recognition and differentiation of single-channel or dual-channel electronic sensors connected to a dual-channel safety combination having two connecting line pairs for emergency stop facilities in the form of electronic sensors or emergency stop buttons, with which a first connecting conductor pair is provided for single-channel operation and the first and a second connecting line pair are provided for dual-channel operation of the safety combination. According to the invention the facility comprises an ohmic resistance arranged in a first connecting line of the second connecting line pair, as well as a transistor connected by its emitter or collector to a first side of the ohmic resistance and by its base to a second side of the ohmic resistance. The transistor is connected to the ohmic resistance on both sides in such a manner that during a current flow of the low-voltage signal through a dual-channel electronic sensor connected to both connecting conductor pairs, a voltage drop at the ohmic resistance switches the transistor, so that an output signal is generated at the collector or emitter of the transistor, indicating connection of the dual-channel electronic sensor.

The term switching here describes a change in the state of the transistor. It is therefore possible within the context of the invention, where a transistor is connected by its emitter to the first side of the ohmic resistance and by its base to the second side of the ohmic resistance, with a dual-channel electronic sensor connected, both for a voltage to be present or a current to flow at its collector as well as for a voltage or a flowing current to be switched off. The term transistor covers any type of electronic or electromechanical switches, which produce a current or voltage change when a voltage of specific polarity is applied to an output. It is a not insignificant element of the invention that the transistor is preferably only switched, when a current flows through the dual-channel electronic sensor from the sensor to the safety combination. The direction of the current flow through the ohmic resistance is thus taken into account according to the invention.

Advantages that can be achieved with the invention result because an output signal is supplied, which can be used for example to activate a switch, which separates or allows connection of the two connecting conductor pairs, depending on whether or not a dual-channel electronic sensor is connected to the safety combination. The specific embodiment also ensures by means of an ohmic resistance that the facility is transparent from the point of view of the electronic sensor and from the point of view of the safety combination during cross connection recognition, in other words that viewed from both directions even cross connections occurring behind the ohmic resistance can be recognized. This would not be possible using diodes, at least not with a safety combination, which is provided between two operating modes, one for single-channel operation and for the connection of a dual-channel electronic sensor, and one for dual-channel operation with two emergency stop buttons connected in parallel, with which the safety combination checks for cross connections. Naturally the ohmic resistance can also be formed by the specific resistance of the material used for the connecting lines.

In one advantageous embodiment of the inventive facility the facility comprises a switch connecting or separating the first and/or second connecting lines of both connecting conductor pairs electrically and being able to be switched by means of the output signal in such a manner that when a dual-channel electronic sensor is connected, an otherwise existing electrical connection between both connecting conductor pairs is separated. The ability to be switched by means of the output signal naturally also includes the amplification and/or inversion of the output signal, as well as all conceivable possibilities for controlling a switch directly or indirectly by means of the output signal.

Advantages result because there is the option of connecting a single-channel or dual-channel emergency stop facility to a dual-channel safety combination, without having to establish, break or change any connections between the channels internally within the safety combination by inserting or removing bridges. This is achieved by monitoring the connecting line pair forming the second channel and by breaking the internal bridge between the two channels automatically by activating the switch when a low-voltage signal of a dual-channel electronic sensor is recognized. This recognition has no influence on the electronic sensor, with the result that the cross connection recognition of the electronic sensor remains up to the terminals of the safety combination.

Therefore neither the operator nor the manufacturer or fitter of a safety combination has to worry whether an emergency stop button or an electronic sensor is connected to the safety combination. The inventive facility recognizes the type of emergency stop facility automatically and closes or opens the switch that establishes an electrical connection between the two channels as required automatically. This avoids incorrect settings and therefore potential safety risks.

The switch is preferably arranged in the safety combination. This prevents damage and excludes safety risks.

According to one advantageous embodiment of the inventive facility the safety combination has two switchable operating modes, a single-channel operating mode for the connection of a single-channel emergency stop button or a single-channel or dual-channel electronic sensor and a dual-channel operating mode for the parallel connection of a dual-channel emergency stop button.

It is also possible for the switch to be switched by means of a second switching signal output by the safety combination in single-channel operating mode when a dual-channel emergency stop button is connected.

A second subject of the invention relates to a method for the automatic recognition and differentiation at least of single-channel or dual-channel electronic sensors connected to a dual-channel safety combination having two connecting line pairs for the connection of emergency stop facilities in the form of electronic sensors or emergency stop buttons, with a first connecting conductor pair being provided for single-channel operation and the first and a second connecting line pair being provided for dual-channel operation of the safety combination. According to the inventive method during a current flow through a dual-channel electronic sensor connected to both connecting line pairs an electrical voltage drop is measured along at least one connecting line of the second connecting line pair, the polarity of said voltage drop being an indicator of a connected dual-channel electronic sensor.

Because of the electrical potential between for example two ends of an ohmic resistance and the polarity between the potentials the inventive method makes it possible to recognize both a dual-channel operating mode and also connected dual-channel electronic sensors. The method can be used to configure safety combinations in a fully automatic manner as a function of the connected emergency stop facilities. It is therefore possible for example to use the inventive method first to recognize dual-channel operation based on an electrical potential between the two ends of the ohmic resistance and then to use the polarity of the voltage between the two potentials to conclude whether two emergency stop buttons are connected in a parallel manner to the two connecting conductor pairs forming the channels or whether there is a dual-channel electronic sensor present. This allows both automatic establishing or separation of electrical connections between the channels and also automatic switching between the operating modes of the safety combination.

In one advantageous embodiment of the invention therefore the voltage drop at an ohmic resistance arranged in a supply line of a supply line pair for the connection of dual-channel emergency stop facilities is used to separate an otherwise existing electrical connection between the two connecting line pairs when a dual-channel electronic sensor is connected.

BRIEF DESCRIPTION OF THE DRAWINGS

The invention is described in more detail below with reference to an exemplary embodiment.

DETAILED DESCRIPTION OF INVENTION

Figure 1:
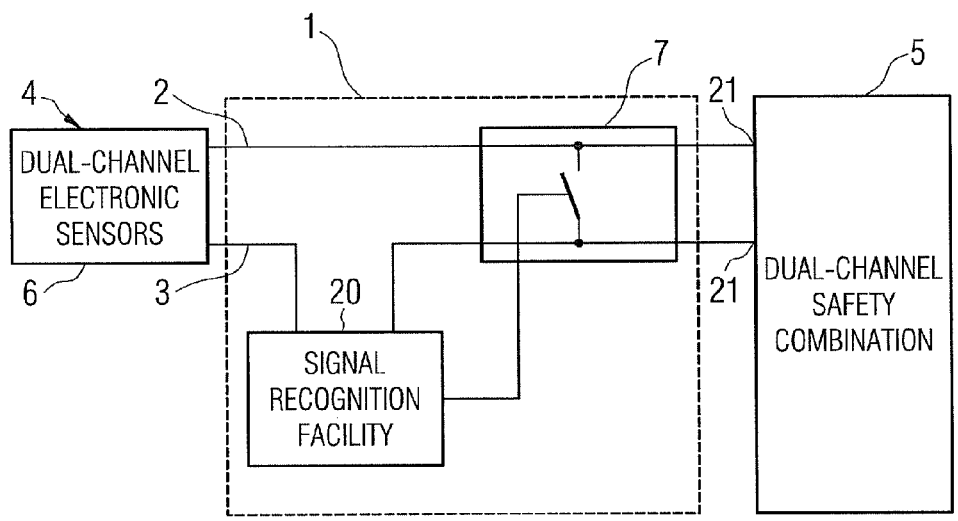
FIG. 1 shows a schematic diagram of the arrangement of an inventive facility.
Figure 2:
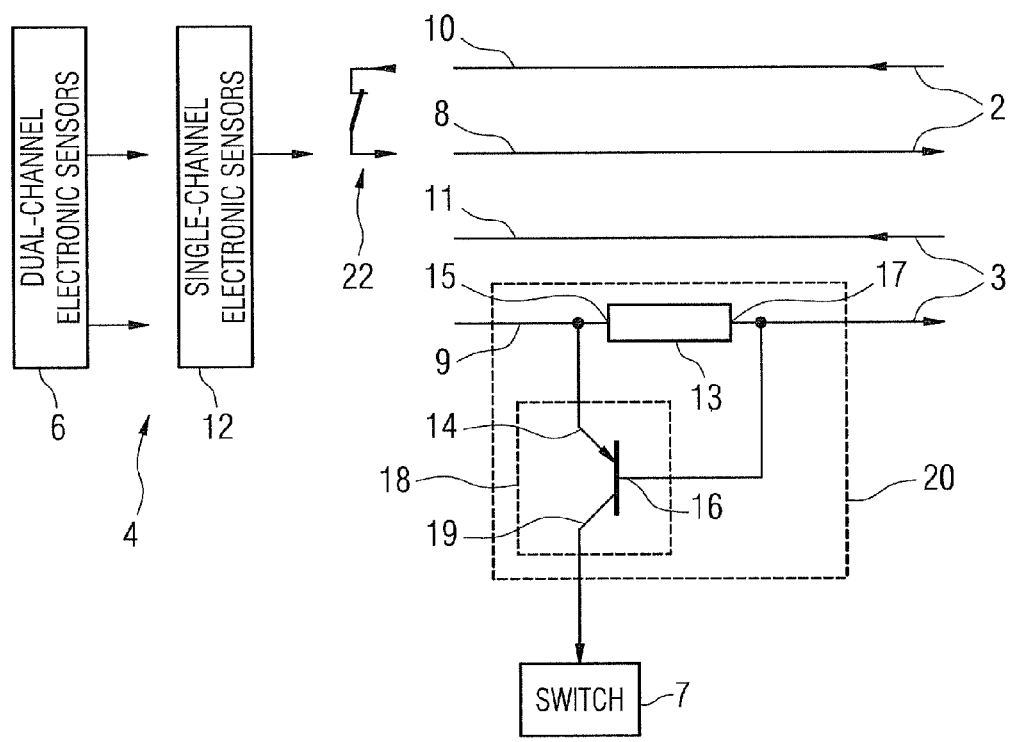
FIG. 2 shows a schematic diagram of the parts of the facility from FIG. 1 used to generate an output signal in detail.

FIG. 1 shows a facility 1 for the automatic recognition and differentiation of dual-channel electronic sensors 6, which are connected to a dual-channel safety combination 5 with two connecting line pairs 2, 3 for emergency stop facilities 4. The emergency stop facilities 4 are provided in the form of dual-channel electronic sensors 6, single-channel electronic sensors 12 or single-channel emergency stop buttons 22, see also FIG. 2. A first connecting conductor pair 2 is hereby provided for single-channel operation (channel 1) and the first 2 and a second connecting line pair 3 are provided for dual-channel operation (channels 1 and 2) of the safety combination 5. The facility 1 essentially comprises a signal recognition facility 20, as well as a switch 7 that can be switched by means of an output signal of the signal recognition facility 20.

The switch 7 that can be switched by means of the output signal of the signal recognition facility 20 hereby serves to connect or separate the first 8, 9 and/or second connecting lines 10, 11 (FIG. 2) of both connecting conductor pairs 2, 3 electrically in such a manner that when a dual-channel electronic sensor is connected, an otherwise existing electrical connection between the two supply conductor pairs is separated.

The signal recognition facility 20 of the facility 1 comprises an ohmic resistance 13 arranged at least in a first connecting line 9 of the second connecting line pair 3 and a transistor 18 connected by its emitter 14 to the first connecting line 9 on a first side 15 of the ohmic resistance 13 and by its base 16 to the first connecting line 9 on a second side 17 of the ohmic resistance 13. The transistor 18 is hereby connected to the first connecting line 9 on both sides of the ohmic resistance 13, in such a manner that during a current flow through a dual-channel electronic sensor 6 connected to both connecting conductor pairs 2, 3 a voltage drop at the ohmic resistance 13 switches the transistor 18 so that when a dual-channel sensor 6 is connected an output signal is generated at the collector 19 of the transistor 18, which is used to control the switch 7. To this end the collector 19 is connected to the electronic bridge between channel 1 and channel 2.

It is important to point out here that recognition of a signal of a dual-channel electronic sensor 6 connected by means of both connecting line pairs 2, 3 to the safety combination, said signal being emitted by a current flow, takes place as follows. A small ohmic resistance 13 is inserted into the supply line 9 forming the input line of the second connecting line pair 3. In the case of a single-channel emergency stop button or a single-channel electronic sensor 12 this input is unused, so there is no current flow across this resistance 13. When a dual-channel sensor 6 is connected, there is a current flow at this input, resulting in a voltage drop at the resistance 13. This voltage drop is used to activate a transistor 18. This transistor 18 controls an internal storage element, which breaks the internal connection between the two connecting conductor pairs 2, 3. If this connection were not broken, the dual-channel electronic sensor 6 would recognize a cross connection and would switch off.

Recognition of whether a dual-channel electronic sensor 6 is connected is hereby realized in the input of the safety combination 5, since electronic sensors are supplied with voltage externally and therefore no further useable signals are available apart from the current flow initiated by the electronic sensor. It is also an important concept of the invention that recognition of the connection of a dual-channel sensor 6 must be invisible to the sensor itself, so that cross connection recognition of the sensor is maintained up to the terminals 21 of the safety combination 5. This eliminates the need for semiconductors for decoupling. If a diode were used for decoupling for example and if a cross connection were to occur behind the diode, the electronic sensor 6 would not be able to recognize this cross connection. It is also essential to maintain the internal protection function of the safety combination 5, which prevents operation of a dual-channel emergency stop button without cross connection recognition.

The invention claimed is:

1. A facility for an automatic recognition and differentiation of a single-channel or dual-channel electronic sensor connected to a dual-channel safety combination with two connecting line pairs, comprising:
    a first connecting line pair for a single-channel operation;
    a second connecting line pair, wherein the first and a second connecting line pairs are provided for a dual-channel operation of the safety combination; and
    an ohmic resistance arranged in at least a first connecting line of the second connecting line pair and a transistor electrically connected by its emitter or collector to a first side of the ohmic resistance and by its base to a second side of the ohmic resistance such that, during a current flow through the dual-channel electronic sensor connected to both connecting line pairs, a voltage drop at the ohmic resistance switches the transistor to generate an output signal at the collector or emitter of the transistor, indicating a connection of the dual-channel electronic sensor,
    wherein the facility further comprises a switch connecting or separating a first and second connecting line of the two connecting line pairs electrically, wherein the switch is switched by the output signal such that, when a dual-channel electronic sensor is connected, an otherwise existing electrical connection between both connecting line pairs is separated.

2. The facility as claimed in claim 1, wherein the single-channel or dual-channel electronic sensor is connected to the dual-channel safety combination with two connecting line pairs for emergency stop facilities, wherein the emergency stop facility is an electronic sensor or an emergency stop button.

3. The facility as claimed in claim 1, wherein the switch is arranged in the safety combination.

4. The facility as claimed in claim 1, wherein the safety combination has two switchable operating modes, a single-channel operating mode for a connection of a single-channel emergency stop button or a single-channel, and a dual-channel operating mode for a parallel connection of a dual-channel emergency stop button.

5. The facility as claimed in claim 4, wherein a switch is also able to be switched by a switching signal output by the safety combination in single-channel operating mode when a dual-channel emergency stop button is connected.

6. A method for an automatic recognition and differentiation of a single-channel or a dual-channel electronic sensor, comprising:
    providing a connection between the sensor and a dual-channel safety combination with two connecting line pairs for a connection of an emergency stop facility;
    providing a first connecting line pair for a single-channel operation;
    providing the first and a second connecting line pairs for a dual-channel operation of the safety combination; and
    measuring an electrical voltage drop during a current flow through a dual-channel electronic sensor connected to both connecting line pairs, wherein the electrical voltage drop is measured at a connecting line of the second connecting line pair, and wherein a polarity of the voltage drop is an indicator of a connected dual-channel electronic sensor, wherein the voltage drop is used to separate an otherwise existing electrical connection between the two connecting line pairs, when a dual-channel electronic sensor is connected.

7. The method as claimed in claim 6, wherein the emergency stop facility is a emergency stop button.

* * * * *